United States Patent
Suzumori

(10) Patent No.: US 9,738,130 B2
(45) Date of Patent: Aug. 22, 2017

(54) SUSPENSION ARM

(71) Applicant: TOYODA IRON WORKS CO., LTD., Toyota-shi, Aichi (JP)

(72) Inventor: Michio Suzumori, Toyota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 0 days.

(21) Appl. No.: 15/033,920

(22) PCT Filed: Apr. 1, 2014

(86) PCT No.: PCT/JP2014/059685
§ 371 (c)(1),
(2) Date: May 3, 2016

(87) PCT Pub. No.: WO2015/072160
PCT Pub. Date: May 21, 2015

(65) Prior Publication Data
US 2016/0263956 A1     Sep. 15, 2016

(30) Foreign Application Priority Data
Nov. 12, 2013  (JP) ................................. 2013-234167

(51) Int. Cl.
*B60G 7/00* (2006.01)

(52) U.S. Cl.
CPC ........ *B60G 7/001* (2013.01); *B60G 2206/016* (2013.01); *B60G 2206/10* (2013.01);
(Continued)

(58) Field of Classification Search
CPC .............. B60G 7/001; B60G 2206/016; B60G 2206/10; B60G 2206/11; B60G 2206/122; B60G 2206/72; B60G 2206/8106
See application file for complete search history.

(56) References Cited

U.S. PATENT DOCUMENTS 5,607,177 A * 3/1997 Kato ...................... B60G 3/06
188/377
5,845,938 A * 12/1998 Kato ..................... B60G 7/001
280/784
(Continued)

FOREIGN PATENT DOCUMENTS

EP        2399765 A1    12/2011
JP    H09-249013 A     9/1997
(Continued)

OTHER PUBLICATIONS

Jul. 5, 2016 Office Action issued in Japanese Patent Application No. 2013-234167.
(Continued)

*Primary Examiner* — Laura Freedman
(74) *Attorney, Agent, or Firm* — Oliff PLC

(57) ABSTRACT

A suspension arm includes an arm body having a longitudinal shape, a wheel-side attachment portion disposed at one end of the arm body, and a vehicle body-side attachment portion disposed at the other end of the arm body, and is mounted near a drive shaft to extend in a lateral direction of a vehicle, the arm body including an overlap portion that overlaps the drive shaft as viewed from a front in a longitudinal direction of a vehicle, a weak portion having lower strength than the overlap portion being provided between the overlap portion and the wheel-side attachment portion, the arm body having a hollow longitudinal shape, and portions on both sides of the weak portion being quenched by high frequency heating so as to have high strength, such that the weak portion is partially provided at an intermediate position between the overlap portion and the wheel-side attachment portion.

3 Claims, 3 Drawing Sheets

(52) U.S. Cl.
CPC .... *B60G 2206/11* (2013.01); *B60G 2206/122* (2013.01); *B60G 2206/72* (2013.01); *B60G 2206/8106* (2013.01)

(56) References Cited

U.S. PATENT DOCUMENTS

| | | | |
|---|---|---|---|
| 5,873,587 A | 2/1999 | Kawabe et al. | |
| 6,298,962 B1* | 10/2001 | Kato | B60G 7/001 188/321.11 |
| 6,572,126 B2* | 6/2003 | Tunzini | B60G 7/001 280/124.134 |
| 7,506,444 B2* | 3/2009 | Weise | B60G 7/001 29/557 |
| 7,665,751 B2* | 2/2010 | Kunert | B60G 3/265 280/124.134 |
| 7,798,506 B2* | 9/2010 | LeBlanc, Sr. | B60G 3/20 280/124.135 |
| 8,186,696 B2* | 5/2012 | Komoto | B60G 7/001 148/654 |
| 8,251,386 B2* | 8/2012 | Chiku | B60G 7/001 280/124.134 |
| 8,651,504 B2* | 2/2014 | Gerhards | B60G 7/001 280/124.134 |
| 8,961,714 B2* | 2/2015 | Sakamoto | B21J 1/06 148/415 |
| 9,233,587 B2* | 1/2016 | Korte | B21D 53/90 |
| 9,487,058 B2* | 11/2016 | Santini | B29D 24/002 |
| 2002/0005621 A1* | 1/2002 | Christophliemke | B60G 7/001 280/124.134 |
| 2011/0127743 A1* | 6/2011 | Musha | B23K 31/00 280/124.1 |
| 2012/0153592 A1 | 6/2012 | Mielke et al. | |
| 2015/0130159 A1 | 5/2015 | Nakasato | |

FOREIGN PATENT DOCUMENTS

| | | |
|---|---|---|
| JP | 2010-260513 A | 11/2010 |
| JP | 2012-006586 A | 1/2012 |
| WO | 2013/0124971 A1 | 8/2013 |

OTHER PUBLICATIONS

Jun. 10, 2014 International Search Report issued in International Patent Application No. PCT/JP2014/059685.
Apr. 12, 2017 Office Action issued in Chinese Application No. 201480060365.1.

* cited by examiner

VEHICLE BODY SIDE ←→ WHEEL SIDE

VEHICLE BODY SIDE ←→ WHEEL SIDE

SUSPENSION ARM

TECHNICAL FIELD

The present invention relates to suspension arms, and more particularly to an improvement in suspension arm that is mounted near a drive shaft.

BACKGROUND ART

A vehicle suspension arm is known which includes (a) an arm body having a longitudinal shape, (b) a wheel-side attachment portion that is disposed at one end of the arm body and coupled to the upper part of an axle carrier, and (c) a vehicle body-side attachment portion that is disposed at the other end of the arm body and coupled to a vehicle body. Patent Document 1 describes a technique of strengthening a curved portion of an arm body by heat treatment etc.

RELATED ART DOCUMENTS

Patent Documents

Patent Document 1: Japanese Patent Application Publication No. 2010-260513

SUMMARY OF THE INVENTION

Problem to be Solved by the Invention

If such a suspension arm is mounted near a drive shaft, there are cases where the arm body is deformed (bent and buckled etc.) by a load and interferes with the drive shaft. Even if the arm body is strengthened by heat treatment etc., a relatively weak portion of the arm body may be deformed and interfere with the drive shaft depending on which part of the arm body is strengthened.

The present invention was developed in view of the above circumstances, and it is an object of the present invention to prevent an arm body of a suspension arm that is mounted near a drive shaft from interfering with the drive shaft in the case where the arm body is deformed by a load.

Solution to the Problem

To achieve the above object, a first aspect of the invention provides a suspension arm, which includes (a) an arm body having a longitudinal shape, (b) a wheel-side attachment portion that is disposed at one end of the arm body, and (c) a vehicle body-side attachment portion that is disposed at the other end of the arm body, and which (d) is mounted near a drive shaft so as to extend in a lateral direction of a vehicle, the suspension arm characterized in that (e) the arm body includes an overlap portion that overlaps the drive shaft as viewed from a front in a longitudinal direction of a vehicle, (f) a weak portion having lower strength than the overlap portion is provided between the overlap portion and the wheel-side attachment portion, (g) the arm body has a hollow longitudinal shape, and (h) portions on both sides of the weak portion are quenched by high frequency heating so as to have high strength, such that the weak portion is partially provided at an intermediate position between the overlap portion and the wheel-side attachment portion.

A second aspect of the invention provides the suspension arm recited in the first aspect of the invention, characterized in that the overlap portion has higher strength than the weak portion by quenching treatment using high frequency heating.

A third aspect of the invention provides the suspension arm recited in the first or second aspect of the invention, characterized in that (a) the suspension arm is mounted such that the wheel-side attachment portion and the vehicle body-side attachment portion are positioned above the drive shaft as viewed from the front, and (b) the arm body includes a curved portion located on its vehicle body-side attachment portion side and curved so as to protrude toward a lower side of the vehicle, and a lower end of the curved portion serves as the overlap portion.

A fourth aspect of the invention provides the suspension arm recited in any one of the first to third aspects of the invention, characterized in that the weak portion is partially provided at an intermediate position between the overlap portion and the wheel-side attachment portion, and portions on both sides of the weak portion have higher strength than the weak portion.

Advantageous Effects of the Invention

In such a suspension arm, the weak portion is provided between the overlap portion and the wheel-side attachment portion of the arm body. Accordingly, when the suspension arm is subjected to an excessive load, the weak portion is preferentially deformed. This prevents interference of the overlap portion with the drive shaft due to deformation of the overlap portion.

In the second aspect of the invention, since the overlap portion has high strength by quenching using high frequency heating, this appropriately prevents interference of the overlap portion with the drive shaft due to deformation of the overlap portion. Since the arm body is strengthened by quenching, the strength continuously varies in the boundary portions with the weak portion that is not strengthened. This restrains stress concentration due to a change in strength and thus restrains breakage and cracking.

The third aspect of the invention is the case where the arm body includes the curved portion that protrudes toward the lower side of the vehicle. Since the lower end of the curved portion serves as the overlap portion, the curved portion is likely to be deformed and interfere with the drive shaft if the arm body has uniform strength. Applying the present invention to the suspension arm thus provides a significant effect of the present invention, namely prevents interference of the curved portion with the drive shaft.

In the fourth aspect of the invention, the weak portion is partially provided at the intermediate position between the overlap portion and the wheel-side attachment portion, and the portions on both sides of the weak portion have relatively high strength. The weak portion is thus more reliably preferentially deformed by a load, which more appropriately prevents interference of the overlap portion with the drive shaft due to deformation of the overlap portion.

MODES FOR CARRYING OUT THE INVENTION

For example, an arm body made of a high tensile steel plate, a round pipe, a square or rectangular pipe, etc. and having a hollow longitudinal shape is preferably used as the arm body of the suspension arm of the present invention. This arm body has tensile strength as high as about 1,000 to 1,500 MPa by strengthening such as quenching, and a part of the arm body which is not strengthened has tensile strength of about 500 to 700 MPa. The weak portion can thus be provided depending whether the strengthening is performed or not. For example, each of the wheel-side attachment portion and the vehicle body-side attachment portion is composed by a cylindrical bush having an elastic material placed therein, and an attachment shaft that is inserted into an attachment hole of the bush, etc.

For example, the overlap portion has high strength by quenching using high frequency heating. However, other heating methods or other strengthening techniques such as nitriding may be used. It is desirable to strengthen not just the overlap portion but the entire arm body except the weak portion. However, only the overlap portion may be strengthened, and the strength of the entire arm body except the overlap portion may be as low as that of the weak portion. The weak portion may be provided by varying the sectional shape of the arm body such as partially reducing the thickness of the arm body. Alternatively, the overlap portion may be strengthened by varying the sectional shape of the arm body such as partially increasing the thickness of the overlap portion.

In the third aspect of the invention, the arm body includes the curved portion that protrudes toward the lower side of the vehicle. However, the shape of the arm body is decided as appropriate, and the present invention is applicable to the case where the arm body has the overlap portion that overlaps the drive shaft as viewed from the front.

Embodiment

An embodiment of the present invention will be described in detail below with reference to the accompanying drawings.

Figure 1:
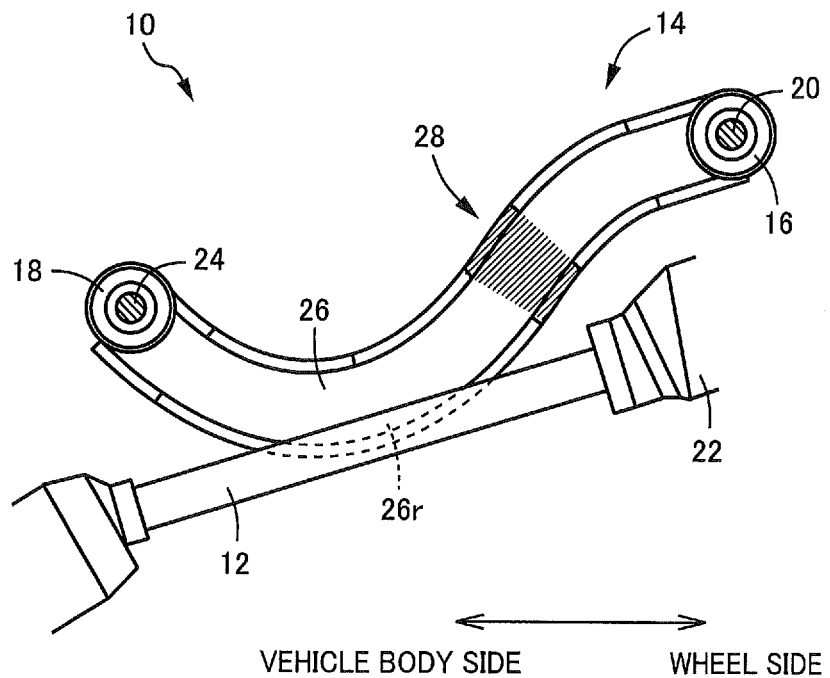
FIG. 1 is a front view of a vehicle suspension arm to which the present invention is applied, as viewed in the longitudinal direction of a vehicle.
Figure 2:
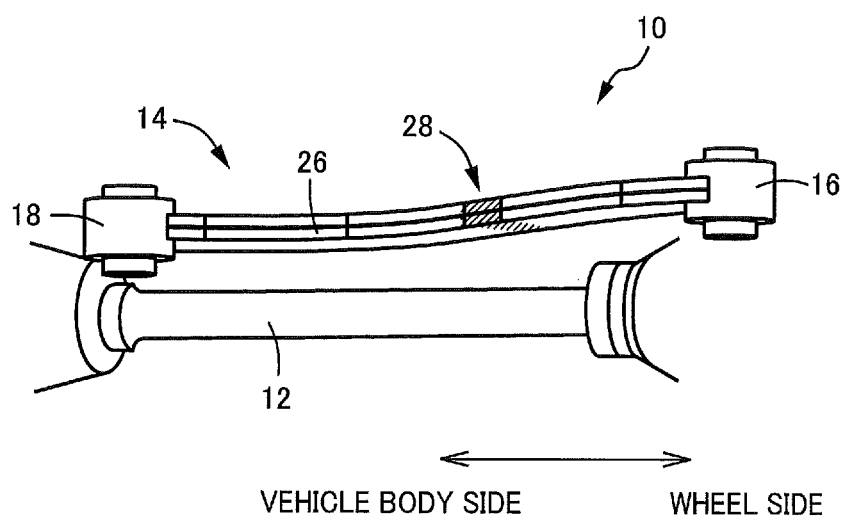
FIG. 2 is a plan view of the suspension arm in FIG. 1 as viewed from above the vehicle.

FIG. 1 is a front view of a vehicle suspension arm 10 to which the present invention is applied, as viewed in the longitudinal direction of a vehicle. The right side in FIG. 1 is the wheel side, and the left side in FIG. 1 is the vehicle body side, namely the side toward the middle of the vehicle in the lateral direction where a differential is disposed. FIG. 2 is a plan view of the suspension arm 10 as viewed from above the vehicle. As can be seen from these figures, the suspension arm 10 is mounted near a drive shaft 12 so as to extend in the lateral direction of the vehicle, and includes an arm body 14 having a longitudinal shape, a wheel-side attachment portion 16 disposed at one end of the arm body 14, and a vehicle body-side attachment portion 18 disposed at the other end of the arm body. Each of the wheel-side attachment portion 16 and the vehicle body-side attachment portion 18 is a cylindrical bush having an elastic material placed therein. The wheel-side attachment portion 16 is coupled to the upper part of an axle carrier 22 via a coupling shaft 20, and the vehicle body-side attachment portion 18 is coupled to a vehicle body via a coupling shaft 24. The wheel-side attachment portion 16 and the vehicle body-side attachment portion 18 are coupled to the coupling shafts 20, 24 at positions above the drive shaft 12 as viewed from the front as shown in FIG. 1.

The arm body 14 is made of a high tensile steel plate and has a hollow longitudinal shape with a rectangular or elliptical sectional shape that is longer in the vertical direction. The arm body 14 is placed in such an attitude that the arm body 14 extends substantially parallel to the drive shaft 12 as viewed in plan as shown in FIG. 2. The arm body 14 has a curved portion 26 on its vehicle body-side attachment portion 18 side, and the curved portion 26 is curved so as to protrude toward the lower side of the vehicle. A lower end 26r of the curved portion 26 overlaps the drive shaft 12 as viewed from the front as shown in FIG. 1. The lower end 26r corresponds to an overlap portion. The entire arm body 14 except a weak portion 28 (shaded area) defined at an intermediate position between the curved portion 26 and the wheel-side attachment portion 16 is quenched by high frequency heating so as to have tensile strength as high as about 1,400 to 1,500 MPa. The high frequency heating is performed by switching on and off a power supply thereof, and the weak portion 28 that is not heated has tensile strength of about 550 to 650 MPa. The entire arm body 14 except the weak portion 28 is thus quenched so as to have high strength. The heating temperature continuously varies in boundary portions on both sides of the weak portion 28, and the tensile strength thus continuously varies in these boundary portions. The weak portion 28 is designed to be located above the drive shaft 12 as viewed from the front as shown in FIG. 1.

Figure 3:
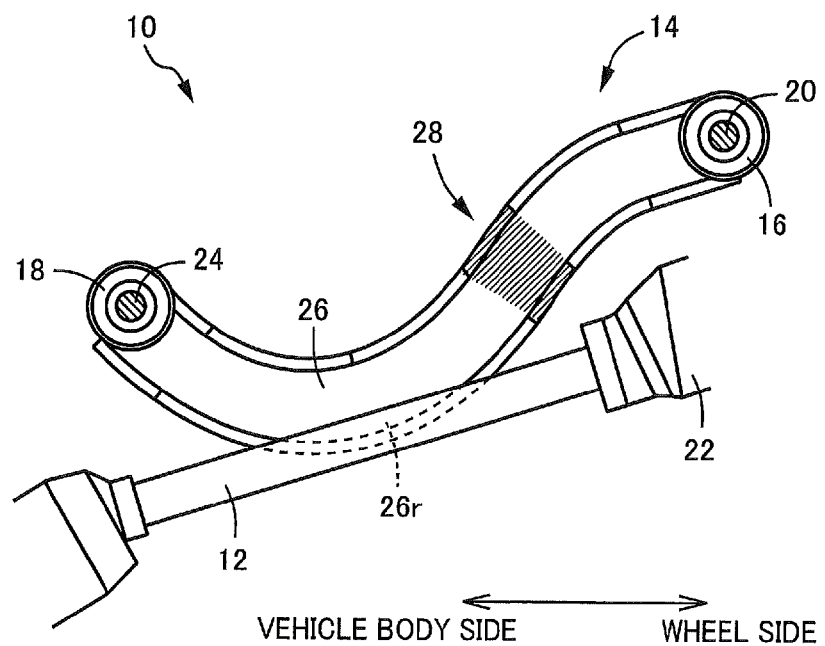
FIG. 3 is a front view corresponding to FIG. 1, showing a deformed state of the suspension arm in FIG. 1.
Figure 4:
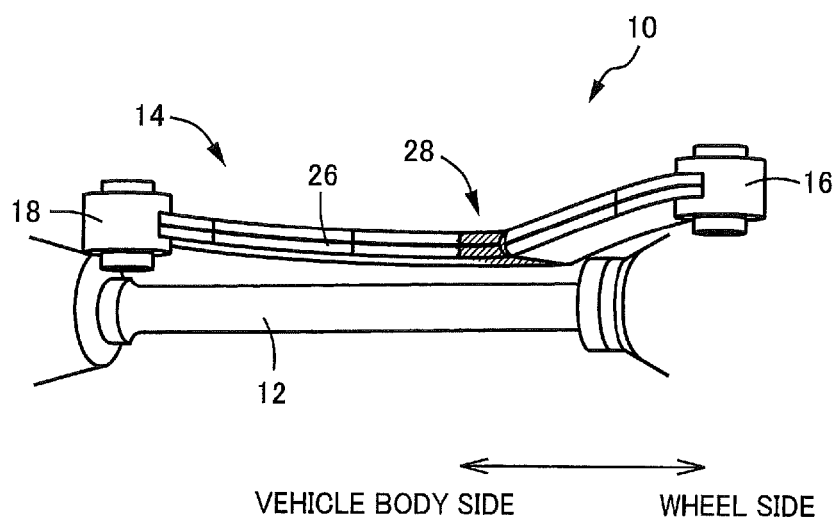
FIG. 4 is a plan view of the suspension arm in FIG. 3.
Figure 5:
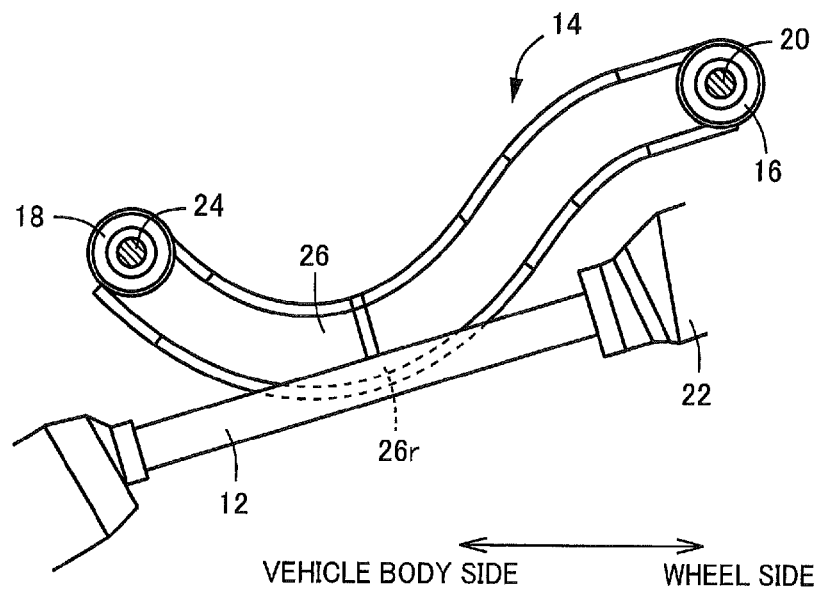
FIG. 5 is a front view corresponding to FIG. 3, showing an example of a deformed state of a suspension arm having substantially uniform strength.
Figure 6:
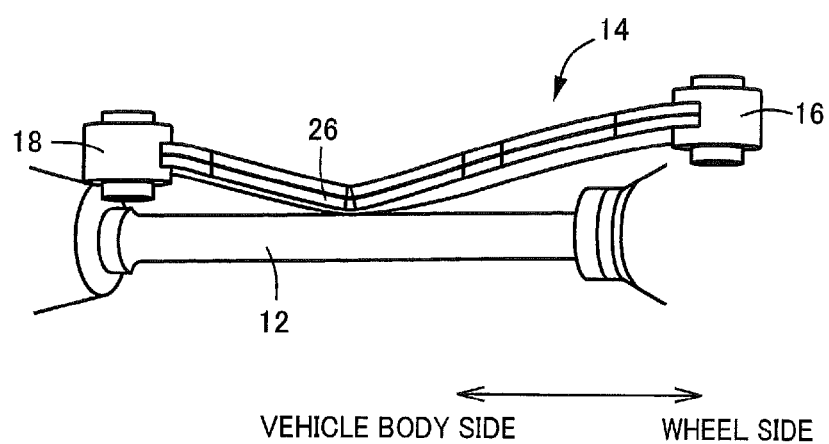
FIG. 6 is a plan view of the suspension arm in FIG. 5.

In such a suspension arm 10, the weak portion 28 is provided between the curved portion 26 and the wheel-side attachment portion 16 of the arm body 14. Accordingly, when the suspension arm 10 is subjected to an excessive load, the weak portion 28 is preferentially deformed as shown in FIGS. 3 and 4. This prevents interference of the lower end 26r with the drive shaft 12 due to deformation of the curved portion 26. If a suspension arm has the same shape as the suspension arm 10 and an arm body 14 of the suspension arm has substantially uniform strength, the arm body 14 is bent and buckled in the curved portion 26 as shown in FIGS. 5 and 6 when subjected to an excessive load, as stress concentration tends to occur in the curved portion 26 in terms of the shape. The lower end 26r may therefore interfere with and damage the drive shaft 12.

Since the curved portion 26 has high strength by quenching using high frequency heating, this appropriately prevents interference of the lower end 26r with the drive shaft 12 due to deformation of the curved portion 26. In particular, since the arm body 14 is strengthened by quenching, the strength continuously varies in the boundary portions with the weak portion 28 that is not strengthened. This restrains stress concentration due to a change in strength and thus restrains breakage and cracking.

The strength can be varied merely by whether heat treatment is performed or not. Unlike conventional heat treatment, the strength can be varied by merely not performing heat treatment on the weak portion 28. This requires no additional cost as compared to the case where the strength is varied by varying the thickness and the sectional shape. The strength can thus be varied easily and inexpensively.

The weak portion 28 is partially provided at the intermediate position between the curved portion 26 and the wheel-side attachment portion 16, and the portions on both sides of the weak portion 28 have relatively high strength. The weak portion 28 is thus more reliably preferentially deformed by a load, which more appropriately prevents interference of the lower end 26r with the drive shaft 12 due to deformation of the curved portion 26.

Although the embodiment of the present invention is described above in detail based on the drawings, the embodiment is shown by way of example only, and the present invention can be embodied in various modified or improved forms based on the knowledge of those skilled in the art.

REFERENCE SIGNS LIST

10: Suspension arm 12: Drive shaft 14: Arm body 16: Wheel-side attachment portion 18: Vehicle body-side attachment portion 22: Axle carrier 26: Curved portion 26r: Lower end portion (Overlap portion) 28: Weak portion

The invention claimed is:

1. A suspension arm, which includes an arm body having a longitudinal shape, a wheel-side attachment portion that is disposed at one end of the arm body, and a vehicle body-side attachment portion that is disposed at the other end of the arm body, and which is mounted near a drive shaft so as to extend in a lateral direction of a vehicle, the arm body including an overlap portion that overlaps the drive shaft as viewed from a front in a longitudinal direction of the vehicle, a weak portion having lower strength than the overlap portion being provided between the overlap portion and the wheel-side attachment portion, the arm body having a hollow longitudinal shape, and portions on both sides of the weak portion being quenched by high frequency heating so as to have high strength, such that the weak portion is partially provided at an intermediate position between the overlap portion and the wheel-side attachment portion.

2. The suspension arm according to claim 1, wherein the overlap portion has higher strength than the weak portion by quenching treatment using high frequency heating.

3. The suspension arm according to claim 1, wherein the suspension arm is mounted such that the wheel-side attachment portion and the vehicle body-side attachment portion are positioned above the drive shaft as viewed from the front, and the arm body includes a curved portion located on its vehicle body-side attachment portion side and curved so as to protrude toward a lower side of the vehicle, and a lower end of the curved portion serves as the overlap portion.

* * * * *